(12) United States Patent
Shibata et al.

(10) Patent No.: US 12,047,848 B2
(45) Date of Patent: Jul. 23, 2024

(54) RELAY DEVICE, RELAY METHOD, AND RELAY PROGRAM

(71) Applicant: NIPPON TELEGRAPH AND TELEPHONE CORPORATION, Tokyo (JP)

(72) Inventors: Naotaka Shibata, Musashino (JP); Hirofumi Yamamoto, Musashino (JP); Keita Takahashi, Musashino (JP); Noriyuki Ota, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 428 days.

(21) Appl. No.: 17/291,259

(22) PCT Filed: Oct. 25, 2019

(86) PCT No.: PCT/JP2019/041889
§ 371 (c)(1),
(2) Date: May 4, 2021

(87) PCT Pub. No.: WO2020/095718
PCT Pub. Date: May 14, 2020

(65) Prior Publication Data
US 2022/0007151 A1    Jan. 6, 2022

(30) Foreign Application Priority Data

Nov. 7, 2018   (JP) .................................. 2018-209945

(51) Int. Cl.
*H04W 4/06*   (2009.01)
*H04B 7/155*   (2006.01)

(52) U.S. Cl.
CPC .............. *H04W 4/06* (2013.01); *H04B 7/155* (2013.01)

(58) Field of Classification Search
CPC ..... H04B 7/155; H04B 7/15528; H04W 4/06; H04W 92/12
See application file for complete search history.

(56) References Cited

U.S. PATENT DOCUMENTS

| 2002/0141371 | A1  | 10/2002 | Hsu    |           |
| 2005/0043035 | A1* | 2/2005  | Diesen | H04W 4/06 |
|              |     |         |        | 725/62    |

(Continued)

FOREIGN PATENT DOCUMENTS

| JP | 2002118589 A | 4/2002  |
| JP | 2005507572 A | 3/2005  |
| JP | 2012248956 A | 12/2012 |

OTHER PUBLICATIONS

Masahiro Fujii et al., Development of base station equipment for introduction of 3.5GHz band TD-LTE, NTT Docomo Technical Journal, vol. 24, No. 2, 2016, pp. 8-13.

(Continued)

*Primary Examiner* — Khaled M Kassim
*Assistant Examiner* — Kai Chang
(74) *Attorney, Agent, or Firm* — Harness, Dickey & Pierce, P.L.C.

(57) ABSTRACT

A relay device including: an information storage unit that stores conversion-target header information; a downlink signal dividing unit that divides a downlink signal received from the radio control device into a header and a payload; a signal replicating unit that makes the same number of copies of the payload of the downlink signal as the number of the plurality of destination radio devices; a downlink signal header information conversion unit that performs conversion on the header of the downlink signal for each destina- (Continued)

tion radio device based on the header information stored in the information storage unit; and a signal addition assignment unit that adds the header converted by the downlink signal header information conversion unit to each of the payloads of the downlink signal replicated by the signal replicating unit, and transfers the payloads to the radio devices respectively corresponding thereto.

11 Claims, 8 Drawing Sheets

(56) References Cited

U.S. PATENT DOCUMENTS

| | | | | |
|---|---|---|---|---|
| 2009/0175214 A1* | 7/2009 | Sfar | ............... | H04J 11/0053 370/315 |
| 2012/0300778 A1* | 11/2012 | Tamura | ............... | H04L 12/66 370/392 |
| 2013/0064116 A1* | 3/2013 | Speight | ............... | H04B 7/15528 370/252 |
| 2014/0334490 A1* | 11/2014 | Nakata | ............... | H04L 69/22 370/392 |
| 2018/0332351 A1* | 11/2018 | Lee | ............... | H04N 21/6408 |
| 2020/0092138 A1* | 3/2020 | Tillotson | ............ | H04L 12/4633 |

OTHER PUBLICATIONS

Anilu Umesh et al., 5G wireless access network standardization trend, NTT Docomo Technical Journal, vol. 25, No. 3, 2017, pp. 33-43.
Ryouta Ishibashi et al., A packet aggregation scheme in wide-area networks for M2M/IoT, Internet Conference (IC2014), Nov. 2014.

\* cited by examiner

Fig. 4

| | DESTINATION | BELONGING DEVICE | SENDER INFORMATION | | | DESTINATION INFORMATION | | |
|---|---|---|---|---|---|---|---|---|
| | | | IP | MAC | ... | IP | MAC | ... |
| UPLINK | RADIO CONTROL DEVICE S1 | RADIO DEVICE A, RADIO DEVICE B | 192.168.1.1 | aa-aa-aa-aa-aa-aa | ... | 192.168.1.10 | s1-s1-s1-s1-s1-s1 | ... |
| | RADIO CONTROL DEVICE S2 | RADIO DEVICE C | 192.168.1.3 | cc-cc-cc-cc-cc-cc | ... | 192.168.1.20 | s2-s2-s2-s2-s2-s2 | ... |
| | ... | ... | ... | ... | ... | ... | ... | ... |
| | RADIO DEVICE A | RADIO CONTROL DEVICE S1 | 192.168.1.10 | s1-s1-s1-s1-s1-s1 | ... | 192.168.1.1 | aa-aa-aa-aa-aa-aa | ... |
| DOWNLINK | RADIO DEVICE B | RADIO CONTROL DEVICE S1 | 192.168.1.10 | s1-s1-s1-s1-s1-s1 | ... | 192.168.1.2 | bb-bb-bb-bb-bb-bb | ... |
| | RADIO DEVICE C | RADIO CONTROL DEVICE S2 | 192.168.1.20 | s2-s2-s2-s2-s2-s2 | ... | 192.168.1.3 | cc-cc-cc-cc-cc-cc | ... |
| | ... | ... | ... | ... | ... | ... | ... | ... |

Fig. 7

| | DESTINATION | BELONGING DEVICE | SENDER INFORMATION | | | DESTINATION INFORMATION | | |
|---|---|---|---|---|---|---|---|---|
| | | | IP | MAC | ... | IP | MAC | ... |
| UPLINK | RADIO CONTROL DEVICE S1 | RADIO DEVICE A, RADIO DEVICE B | 192.168.1.99 | xx-xx-xx-xx-xx-xx | ... | 192.168.1.10 | s1-s1-s1-s1-s1-s1 | ... |
| | RADIO CONTROL DEVICE S2 | RADIO DEVICE C | 192.168.1.99 | xx-xx-xx-xx-xx-xx | ... | 192.168.1.20 | s2-s2-s2-s2-s2-s2 | ... |
| | ... | ... | ... | ... | ... | ... | ... | ... |
| DOWN-LINK | RADIO DEVICE A | RADIO CONTROL DEVICE S1 | 192.168.1.99 | xx-xx-xx-xx-xx-xx | ... | 192.168.1.1 | aa-aa-aa-aa-aa-aa | ... |
| | RADIO DEVICE B | RADIO CONTROL DEVICE S1 | 192.168.1.99 | xx-xx-xx-xx-xx-xx | ... | 192.168.1.2 | bb-bb-bb-bb-bb-bb | ... |
| | RADIO DEVICE C | RADIO CONTROL DEVICE S2 | 192.168.1.99 | xx-xx-xx-xx-xx-xx | ... | 192.168.1.3 | cc-cc-cc-cc-cc-cc | ... |
| | ... | ... | ... | ... | ... | ... | ... | ... |

RELAY DEVICE, RELAY METHOD, AND RELAY PROGRAM

CROSS-REFERENCE TO RELATED APPLICATIONS

This application is a 371 U.S. National Phase of International Application No. PCT/JP2019/041889 filed on Oct. 25, 2019, which claims priority to Japanese Application No. 2018-209945 filed on Nov. 7, 2018. The entire disclosures of the above applications are incorporated herein by reference.

TECHNICAL FIELD

The present invention relates to a relay device, a relay method, and a relay program.

BACKGROUND ART

Application of a distributed antenna system to a radio communication system such as a mobile communication system is in progress, in which a plurality of radio devices are controlled by one radio control device as one cell (service area). For example, as shown in FIG. 8, a relay device called an FHM (Fronthaul Multiplexer) is provided between a radio control device and a plurality of radio devices (for example, see NPL 1).

A relay device 1 shown in FIG. 8 relays between a plurality of radio devices (for example, a radio device A and a radio device B) that perform radio communication with terminals, and a radio control device (for example, a radio control device S) that controls the plurality of radio devices in a distributed antenna system. The relay device 1 includes a signal replicating unit 2 and a signal combining unit 3. The signal replicating unit 2 replicates a downlink signal transmitted from the radio control device S and transfers the replicated signals to the radio devices, respectively. The signal combining unit 3 combines uplink signals transmitted from the radio devices, and transmits the combined signal to the radio control device.

Signals adopted for an interface called a CPRI (Common Public Radio Interface) are transmitted and received via links between the radio control device and the radio devices. The signal replicating unit of the relay device makes the same number of copies of a CPRI downlink signal as the number of radio devices, and distributes the copies to the radio devices, respectively. The signal combining unit of the relay device combines CPRI uplink signals received from the radio devices. By arranging the relay device that has such functions, it is possible to build a cell that includes a plurality of radio devices, using one radio control device.

In addition to distributed antenna systems that use a relay device that distributes/combines CPRI signals, some distributed antenna systems use a relay device that distributes/combines RF (Radio Frequency) signals generated after radio signal processing has been fully completed.

Meanwhile, for future mobile communication systems, there is the issue of an increase in the amount of data transmitted between a radio control device and radio devices when CPRI signals that quantize IQ data of radio signal waveforms are used for transmission. Therefore, studies have been conducted to reduce the amount of transmission data by redefining the functional division between a radio control device and radio devices (for example, see NPL 2).

There are a plurality of candidates for the division point in the function division redefinition. According to NPL 2, for example, in the case of the LLS (Lower Layer Split), a radio control device holds the upper PHY (Physical) layer and the layers above it, and radio devices hold the lower PHY layer and the layers below it. In the case of the HLS (Higher Layer Split), a radio control device holds the PDCP (Packet Data Convergence Protocol) layer and the layers above it, and radio devices hold the lower RLC (Radio Link Control) layer and the layers below it.

On the other hand, according to a conventional CPRI division point, a radio control device holds the PHY layer and the layers above it, and radio devices only hold an RF function unit. Here, in the cases of the HLS and the LLS, unlike in the case of the conventional CPRI, it is assumed that signals are transmitted in a format in which sender/destination information is added to the header.

For example, in the case of LLS, signals are exchanged between a radio control device and radio devices through the eCPRI (Enhanced Common Public Radio Interface), and the UDP/IP, the Ethernet, or the like is used as a protocol. The UDP/IP is included in the protocols for HLS as well.

CITATION LIST

Non Patent Literature

[NPL 1] Masahiro FUJII and three other authors, "NTT DOCOMO Technical Journal, Vol. 24, No. 2, 3.5 GHz Tai TD-LTE Dounyu Ni Muketa Kitikyoku Souchi No Kaihatu (Base station apparatus development for introduction of 3.5 GHz band TD-LTE)", The Telecommunications Association, July 2016, pp. 8-13

[NPL 2] Umesh ANIL and four other authors, "NTT DOCOMO Technical Journal, Vol. 25, No. 3, 5G Musen Akusesu Nettowâku Hyouzyunka Doukou (5G wireless access network standardization trend)", The Telecommunications Association, October 2017, pp. 33-43

SUMMARY OF THE INVENTION

Technical Problem

With a relay device of a conventional distributed antenna system, when distributing downlink signals, it is not possible to change the destination information of the header for each transfer-destination radio device. Therefore, the radio devices may be unable to properly receive a signal, and may determine that the transferred signal is not a signal addressed thereto, and discard the signal.

In addition, the relay device in a distributed antenna system needs to add header information in a format that can be recognized by the radio control device, when combining and transmitting uplink signals. However, conventional relay devices do not distinguish between the header and the payload, and combine the header information of signals received from each radio device as well. Hereinafter, a case where signals from the radio device A and the radio device B are combined will be studied, for example.

The sender information included in the header of a signal from the radio device A indicates the radio device A, and the sender information included in the header of a signal from the radio device B indicates the radio device B. If a bit-to-bit combining method is applied to such sender information, a value that is different from the value indicating the radio device A or the value indicating the radio device B is generated through combination, and thus sender information becomes a meaningless value.

Also, even if a combining method through which one of the pieces of sender information is selected is to be used, it is not possible to discern the radio device that the radio control device is communicating with, i.e. it is not possible to discern the sender information that the radio control device can use to recognize the radio device. Therefore, the relay device cannot select one of the pieces of sender information.

As described above, conventionally, there is a problem in that the relay device cannot appropriately set sender information and destination information when transferring uplink/downlink signals.

The present invention aims to provide a relay device, a relay method, and a relay program that, when transferring an uplink signal and a downlink signal, make it possible to appropriately set sender information and destination information, and realize downlink broadcast distribution and uplink signal combination.

Means for Solving the Problem

A relay device according to one aspect of the present invention is a relay device that relays between a plurality of radio devices that perform radio communication with terminals, and at least one radio control device that controls the radio devices, the relay device including: an information storage unit that stores conversion-target header information; a downlink signal dividing unit that divides a downlink signal received from the radio control device into a header and a payload; a signal replicating unit that makes the same number of copies of the payload of the downlink signal as the number of the plurality of destination radio devices; a downlink signal header information conversion unit that performs conversion on the header of the downlink signal for each destination radio device based on the header information stored in the information storage unit; a signal addition assignment unit that adds the header converted by the downlink signal header information conversion unit to each of the payloads of the downlink signal replicated by the signal replicating unit, and transfers the payloads to the radio devices respectively corresponding thereto; an uplink signal dividing unit that divides each of uplink signals received from the plurality of radio devices into a header and a payload; a signal combining unit that combines payloads of the plurality of uplink signals for each destination radio control device; an uplink signal header information conversion unit that performs conversion on the header of the uplink signal for each destination radio control device based on the header information stored in the information storage unit; and a signal addition unit that adds the header converted by the uplink signal header information conversion unit to the payload of the uplink signal generated through combination performed by the signal combining unit, and transfers the payload to the radio control device corresponding thereto.

The relay device according to one aspect of the present invention may further include an information acquisition unit that acquires the header information stored in the information storage unit, based on at least one of a signal transmitted from the radio device to the radio control device and a signal transmitted from the radio control device to the radio device.

Also, in the relay device according to one aspect of the present invention, the information acquisition unit may store, for each radio device, destination information and sender information regarding the uplink signal in association with each other in the information storage unit as header information for downlink communication, and store, for each radio control device, destination information and sender information regarding the downlink signal in association with each other in the information storage unit as header information for uplink communication, the downlink signal header information conversion unit may perform conversion on the destination information of the downlink signal using the sender information of the uplink signal, based on the header information for downlink communication stored in the information storage unit, and the uplink signal header information conversion unit may perform conversion on the sender information of the uplink signal by using the destination information of the downlink signal, based on the header information for uplink communication stored in the information storage unit.

Also, in the relay device according to one aspect of the present invention, the information acquisition unit may acquire information that identifies the destination and the sender as the radio control device or the radio device, based on the header information of a signal that has a predetermined direction.

Also, in the relay device according to one aspect of the present invention, the downlink signal header information conversion unit may perform conversion only on destination information, and the uplink signal header information conversion unit may perform conversion only on sender information.

Also, in the relay device according to one aspect of the present invention, both the downlink signal header information conversion unit and the uplink signal header information conversion unit may perform conversion on destination information and sender information.

A relay method according to one aspect of the present invention is a relay method for relaying between a plurality of radio devices that perform radio communication with terminals, and at least one radio control device that controls the radio devices, the relay method including: a step in which an information storage unit stores conversion-target header information; a step of dividing a downlink signal received from the radio control device into a header and a payload; a step of making the same number of copies of the payload of the downlink signal as the number of the plurality of destination radio devices; a step of performing conversion on the header of the downlink signal for each destination radio device based on the header information stored in the information storage unit; a step of adding the converted header to each of the replicated payloads of the downlink signal, and transferring the payloads to the radio devices respectively corresponding thereto; a step of dividing each of uplink signals received from the plurality of radio devices into a header and a payload; a step of combining payloads of the plurality of uplink signals for each destination radio control device; a step of performing conversion on the header of the uplink signal for each destination radio control device based on the header information stored in the information storage unit; and a step of adding the converted header to the payload of the uplink signal generated through combination, and transferring the payload to the radio control device corresponding thereto.

A relay program according to one aspect of the present invention enables a computer to function as the units included in the above-described relay device.

Effects of the Invention

The present invention makes it possible to appropriately set sender information and destination information, and realize downlink broadcast distribution and uplink signal combination, when transferring an uplink signal and a downlink signal.

BRIEF DESCRIPTION OF DRAWINGS

FIG. 4 is a diagram showing a specific example of information that is stored in an information storage unit.

FIG. 7 is a diagram showing a specific example of information that is stored in the information storage unit shown in FIG. 6(a) and FIG. 6(b).

DESCRIPTION OF EMBODIMENTS

Figure 1:
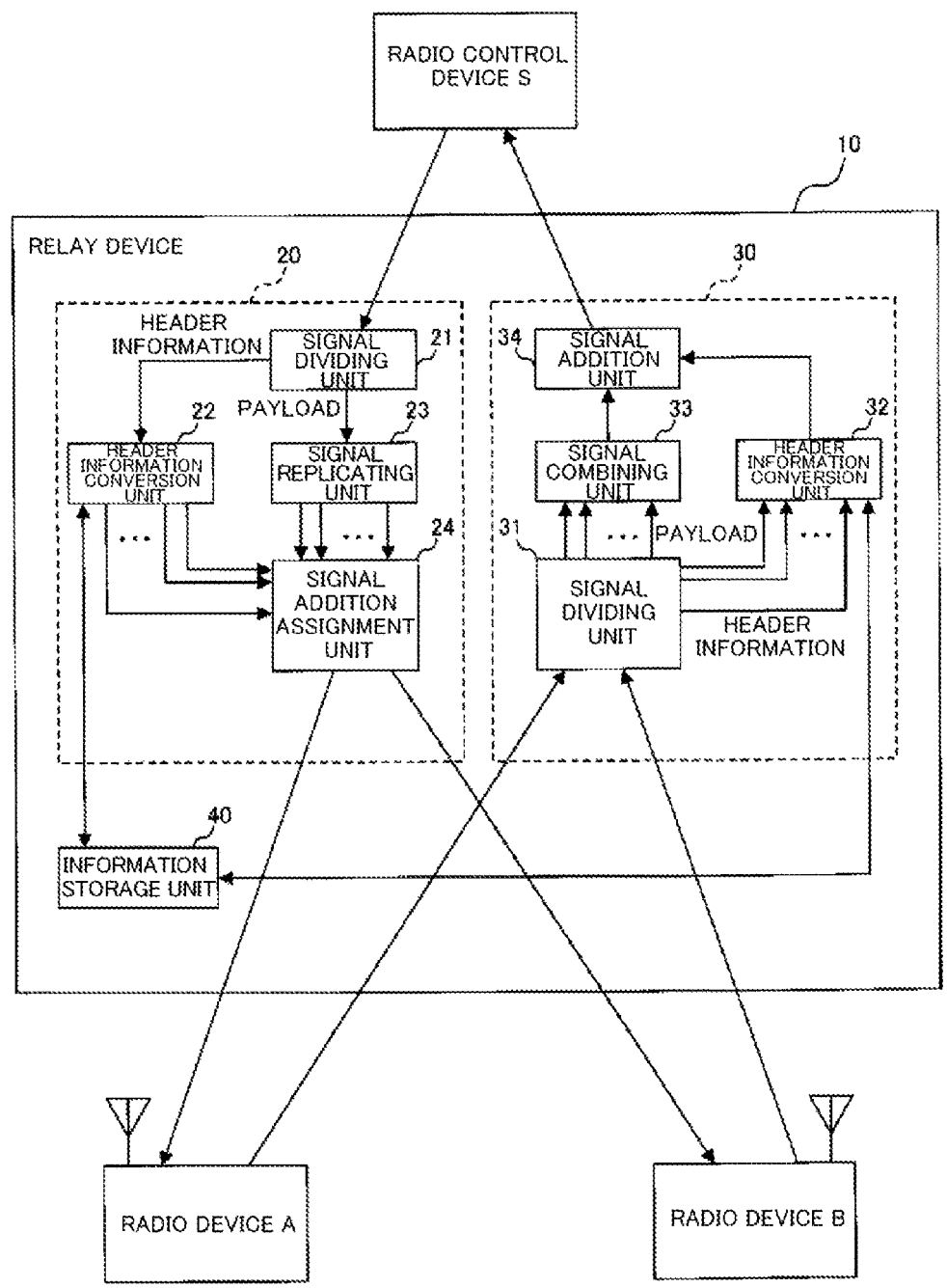
FIG. 1 is a diagram showing an example of a configuration of a relay device according to an embodiment, and surroundings thereof.

The following describes an embodiment of a relay device with reference to the drawings. FIG. 1 shows an example of a configuration of a relay device 10 according to an embodiment, and the surroundings thereof. The relay device 10 shown in FIG. 1 relays between a plurality of radio devices (for example, a radio device A and a radio device B) that perform radio communication with terminals, and at least one radio control device (for example, a radio control device S) that controls the plurality of radio devices in a distributed antenna system, for example. The relay device 10 includes a downlink signal processing unit 20, an uplink signal processing unit 30, and an information storage unit 40, for example.

The downlink signal processing unit 20 includes a signal dividing unit 21, a header information conversion unit 22, a signal replicating unit 23, and a signal addition assignment unit 24.

The signal dividing unit 21 is a downlink signal dividing unit that divides a downlink signal received from the radio control device S into a header and a payload, outputs header information included in the header to the header information conversion unit 22, and outputs the payload to the signal replicating unit 23.

The header information conversion unit 22 is a downlink signal header information conversion unit that converts the header information input from the signal dividing unit 21 so as to be in a transmittable format for each destination radio device based on conversion-target header information and so on (described below with reference to FIG. 4) stored in the information storage unit 40, and outputs each piece of converted header information to the signal addition assignment unit 24.

The signal replicating unit 23 makes the same number of copies of the payload input from the signal dividing unit 21 as the number of destination radio devices, and outputs each copy of the payload to the signal addition assignment unit 24.

The signal addition assignment unit 24 adds the header information converted by the header information conversion unit 22 to each copy of the payload made by the signal replicating unit 23, transfers each payload, to which the header information has been added, to the radio device corresponding thereto by assigning the payload to the port corresponding thereto.

The uplink signal processing unit 30 includes a signal dividing unit 31, a header information conversion unit 32, a signal combining unit 33, and a signal addition unit 34.

The signal dividing unit 31 is an uplink signal dividing unit that divides each of the uplink signals received from the radio devices into a header and a payload, outputs header information included in the headers to the header information conversion unit 32, and outputs the payloads to the signal combining unit 33.

The header information conversion unit 32 is an uplink signal header information conversion unit that converts the header information input from the signal dividing unit 31 so as to be in a transmittable format for each destination radio control device based on conversion-target header information and so on (described below with reference to FIG. 4) stored in the information storage unit 40, and outputs each piece of converted header information to the signal addition unit 34.

The signal combining unit 33 combines the payloads input from the signal dividing unit 31 into a payload for each destination radio control device, and outputs the combined payload to the signal addition unit 34.

The signal addition unit 34 adds the header information converted by the header information conversion unit 32 to the payload generated through combination performed by the signal combining unit 33, and transfers the payload, to which header information has been added, to the radio control device by outputting the payload to the port corresponding thereto.

Figure 2:
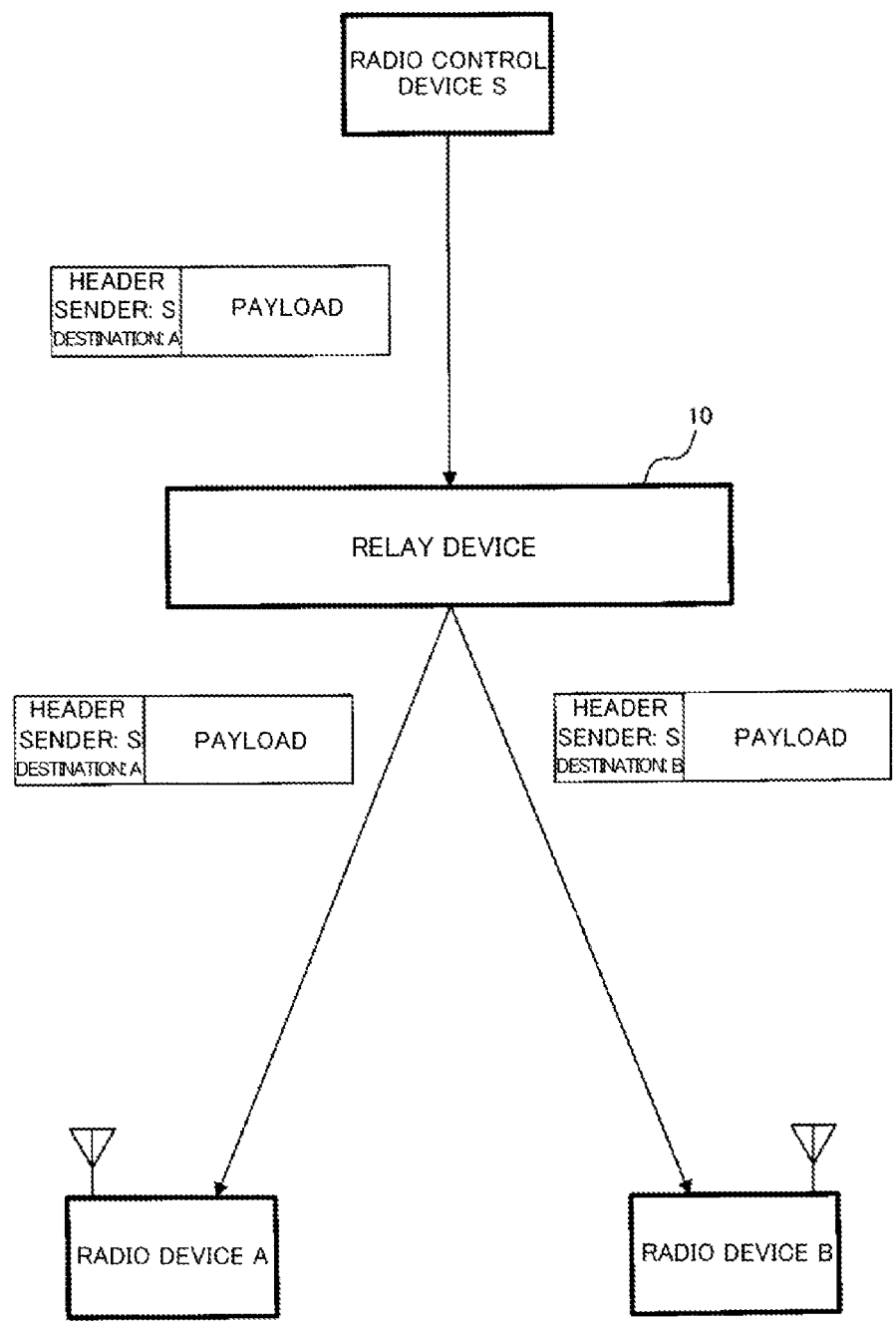
FIG. 2 is a diagram showing functions of the relay device when performing downlink communication in a distributed antenna system.

FIG. 2 shows functions of the relay device 10 when performing downlink communication in the distributed antenna system. In downlink communication, a value corresponding to one of the radio devices is specified by destination information included in the header information of a signal transmitted from the radio control device S. In this example, the radio device A is set as the destination.

Upon receiving a signal from the radio control device S, the relay device 10 only changes the destination information in the received signal for each radio device, and transfers the signal. Therefore, signals in which the radio device A and the radio device B are set as addresses are respectively transmitted thereto, and the radio device A and the radio device B can properly receive the signals, respectively.

Figure 3:
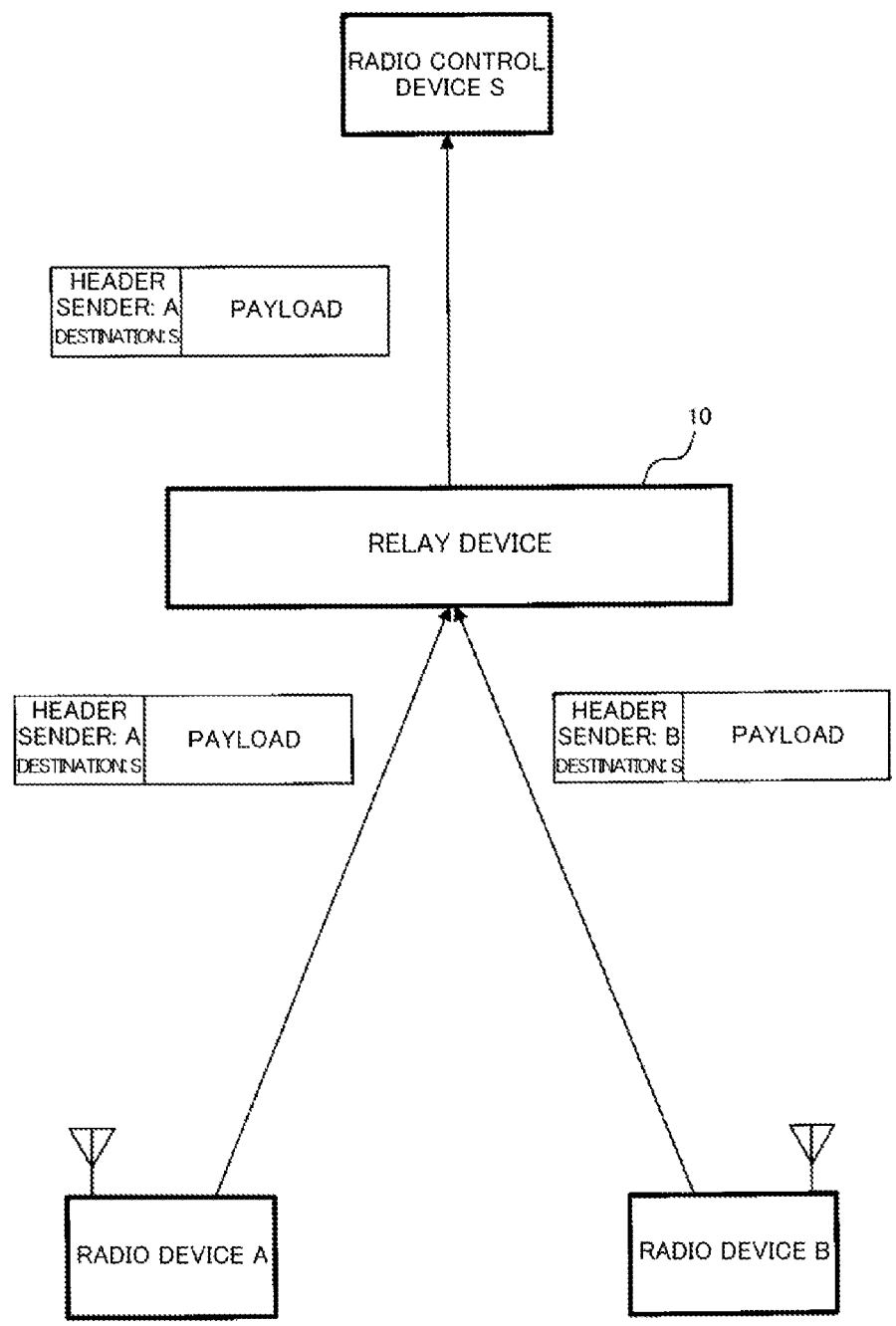
FIG. 3 is a diagram showing functions of the relay device when performing uplink communication in the distributed antenna system.

FIG. 3 shows functions of the relay device 10 when performing uplink communication in the distributed antenna system. In this example, in the header of a signal transmitted from each radio device, the radio device is set as the sender, and radio control device S is set as the address.

Upon receiving signals from the radio device A and the radio device B, the relay device 10 adds the sender information regarding the radio device recognized by the radio control device S as a communication party, e.g. the radio device A, to the header, and transmits the signal to the radio control device S. Therefore, the radio control device S can properly recognize sender information, and can properly receive the signal.

Note that the radio device recognized by the radio control device S as a communication party is, for example, one of the radio devices specified by destination information that the radio control device S can include in the header information when transmitting a signal in downlink communication.

Although FIG. 1 shows an example of a configuration of a distributed antenna system in which all of the radio devices connected to the relay device 10 belong to one radio control device S, the distributed antenna system is not limited to such a configuration. For example, the distributed antenna system may have a configuration in which a plurality of radio control devices (for example, radio control devices S1, S2, etc.) are arranged, and a plurality of radio devices (for example, radio devices A, B, C, etc.) connected to the relay device 10 each belong to one of the plurality of radio control devices.

If a plurality of radio control devices are arranged in the distributed antenna system, the information storage unit 40 (FIG. 1) of the relay device 10 also stores the belongingness relationship between the plurality of radio control devices and the plurality of radio devices.

For example, in downlink communication, upon the relay device 10 receiving a signal from any one of the radio control devices, the header information conversion unit 22 checks the sender information indicated by the received signal, and only prepares header information for the radio device that belong to the radio control device. Also, the signal replicating unit 23 makes the same number of copies of the signal as the number of radio devices that belong to the radio control device. Thereafter, the signal addition assignment unit 24 transfers the signal to only the radio devices that belong to the radio control device.

Also, in uplink communication, upon the relay device 10 receiving signals from a plurality of radio devices, the signal combining unit 33 performs signal combination for each of the radio devices that are indicted as belonging to the same radio control device by the information stored in the information storage unit 40 (described in detail with reference to FIG. 4). Also, the header information conversion unit 32 prepares a converted header for each of the radio control devices to which the plurality of radio devices belong. The signal addition unit 34 assigns a signal to each radio control device, and transmits the signals. In other words, when there is only one radio control device, the signal addition unit 34 outputs a signal to the port corresponding thereto, whereas, when there are two or more radio control devices, the signal addition unit 34 has the function of assigning a signal to each radio control device, as with the signal addition assignment unit 24.

FIG. 4 shows a specific example of information that is stored in the information storage unit 40. The information storage unit 40 stores, for example, an IP address and a MAC address as header information. Here, the IP address and the MAC address of each radio device are held as destination information for downlink communication. On the other hand, the IP address and the MAC address of the radio control device to which each radio device belongs are held as sender information for downlink communication.

That is to say, in the example shown in FIG. 4, the radio device A and the radio device B belong to the radio control device S1 and perform communication, and the radio device C belongs to the radio control device S2 and performs communication.

The IP address and the MAC address of each radio control device are held as destination information for uplink communication. On the other hand, the IP address and the MAC address of one of the radio devices recognized by each radio control device as a communication party are held as sender information for uplink communication.

That is to say, the example in FIG. 4 shows that the radio device A is recognized as the communication party of the radio control device S1, and the radio device C is recognized as the communication party of the radio control device S2. Note that FIG. 4 only shows an example and the information stored in the information storage unit 40 is not limited to the information shown in FIG. 4.

Figure 5:
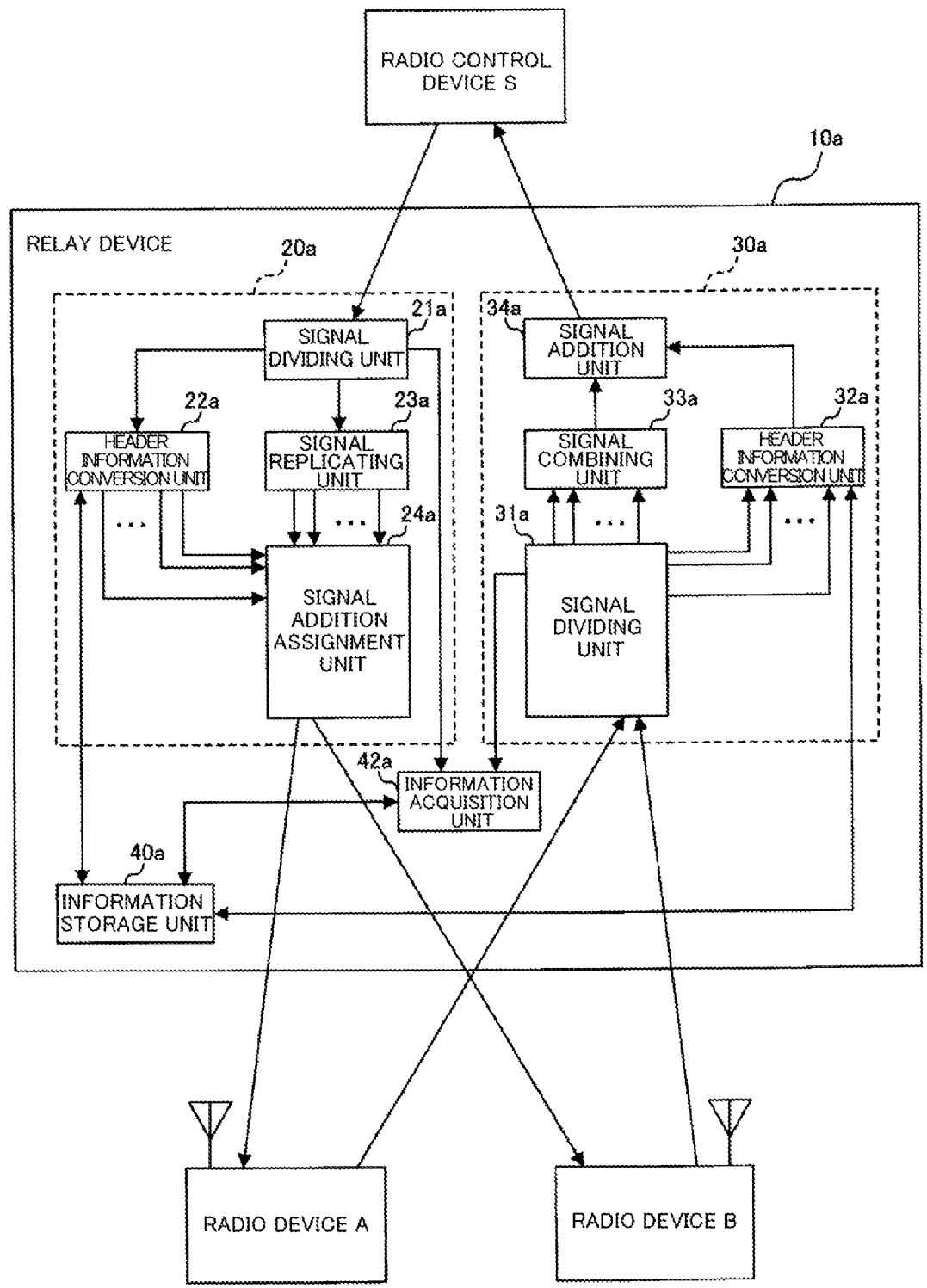
FIG. 5 is a diagram showing an example of a configuration of a relay device according to another embodiment, and surroundings thereof.

Next, another embodiment of a relay device will be described. FIG. 5 shows an example of a configuration of a relay device 10a according to another embodiment, and the surroundings thereof.

The relay device 10a shown in FIG. 5 relays between a plurality of radio devices (for example, a radio device A and a radio device B) that perform radio communication with terminals, and at least one radio control device (for example, a radio control device S) that controls the plurality of radio devices in a distributed antenna system, for example. The relay device 10a includes a downlink signal processing unit 20a, an uplink signal processing unit 30a, an information storage unit 40a, and an information acquisition unit 42a, for example.

The downlink signal processing unit 20a includes a signal dividing unit 21a, a header information conversion unit 22a, a signal replicating unit 23a, and a signal addition assignment unit 24a.

The signal dividing unit 21a is a downlink signal dividing unit that divides a downlink signal received from the radio control device S into a header and a payload, outputs header information included in the header to the header information conversion unit 22a, and outputs the payload to the signal replicating unit 23a. Also, the signal dividing unit 21a divides sender information (a radio control device address (a)) and destination information (a radio device address (b)) from the downlink signal received from the radio control device S, and outputs the divided sender information and destination information to the information acquisition unit 42a.

The header information conversion unit 22a is a downlink signal header information conversion unit that converts the header information input from the signal dividing unit 21a so as to be in a transmittable format for each destination radio device based on information stored in the information storage unit 40a described below, and outputs each piece of converted header information to the signal addition assignment unit 24a.

The signal replicating unit 23a makes the same number of copies of the payload input from the signal dividing unit 21a as the number of destination radio devices, and outputs each copy of the payload to the signal addition assignment unit 24a.

The signal addition assignment unit 24a adds the header information converted by the header information conversion unit 22a to each copy of the payload made by the signal replicating unit 23a, transfers each payload, to which the header information has been added, to the radio device corresponding thereto by assigning the payload to the port corresponding thereto.

The uplink signal processing unit 30a includes a signal dividing unit 31a, a header information conversion unit 32a, a signal combining unit 33a, and a signal addition unit 34a.

The signal dividing unit 31a is an uplink signal dividing unit that divides each of the uplink signals received from the radio devices into a header and a payload, outputs header information included in the headers to the header information conversion unit 32a, and outputs the payloads to the signal combining unit 33a. Also, the signal dividing unit 31a divides sender information (a radio device address (c)) and destination information (a radio control device address (d)) from each of the uplink signals received from the radio devices, and outputs the divided sender information and destination information to the information acquisition unit 42a.

The header information conversion unit 32a is an uplink signal header information conversion unit that converts the header information input from the signal dividing unit 31a so as to be in a transmittable format for each destination radio control device based on information stored in the information storage unit 40a described below, and outputs each piece of converted header information to the signal addition unit 34a.

The signal combining unit 33a combines the payloads input from the signal dividing unit 31a into a payload for each destination radio control device, and outputs the combined payload to the signal addition unit 34a.

The signal addition unit 34a adds the header information converted by the header information conversion unit 32a to the payload generated through combination performed by the signal combining unit 33a, and transfers the payload, to which header information has been added, to the radio control device by outputting the payload to the port corresponding thereto.

The information acquisition unit 42a acquires, for each radio control device, the sender information (the radio control device address (a)) and destination information (the radio device address (b)) of the downlink signal from the signal dividing unit 21a, and acquires, for each radio device, the sender information (the radio device address (c)) and destination information (the radio control device address (d)) of the uplink signal from the signal dividing unit 31a, for example. Thereafter, the information acquisition unit 42a stores the sender information ((a) and (c)) and the destination information ((b) and (d)) thus acquired, in the information storage unit 40a.

Here, the radio device address (b) is information indicating the radio device recognized by the radio control device at the radio control device address (a) as a communication party. The radio control device address (d) is information indicating the radio control device to which the radio device at the radio device address (c) belongs.

When there are a plurality of radio control devices, different destination information (radio device address (b)) is set for each radio control device in a downlink signal. That is to say, the information acquisition unit 42a checks the sender information (the radio control device address (a)) and the destination information (the radio device address (b)) in the downlink signal at the same time, and stores, for each radio control device address (a), which is destination information, the radio device address (b) of the radio device recognized by the radio control device as the communication party, in the information storage unit 40a as header information for uplink communication.

Also, when there are a plurality of radio control devices, different destination information (radio control device address (d)) is set for each radio control device to which radio devices belong, in an uplink signal. That is to say, the information acquisition unit 42a checks the sender information (the radio device address (c)) and the destination information (the radio control device address (d)) in the uplink signal at the same time, and stores, for each radio device address (c), which is destination information, the radio control device address (d) of the radio control device to which the radio device belongs in the information storage unit 40a as header information for downlink communication.

Therefore, in uplink communication, the header information conversion unit 32a can convert sender information in the header information for uplink communication stored in the information storage unit 40a, using the radio device address (b) stored in association with the radio control device address (a) that is the destination information regarding the uplink signal. In downlink communication, the header information conversion unit 22a can convert destination information in the header information for downlink communication stored in the information storage unit 40a, using the radio device address (c) stored in association with the radio control device address (d) that is the sender information regarding the downlink signal.

It is assumed that, in the relay device 10a, the port of the connected ports to which a radio control device is connected, and the ports to which radio devices are connected, are determined in advance.

However, a signal from which whether the sender thereof is a radio control device or a radio device can be discerned is also transmitted between a radio control device and a radio device. Therefore, the information acquisition unit 42a may be configured to check a signal from which whether the sender thereof is a radio control device or a radio device can be discerned, and discern which port of the ports connected to the relay device 10a is connected to a radio control device and which port is connected to a radio device.

For example, in the case of the eCPRI, a remote reset is transmitted from the radio control device to the radio devices. Therefore, the information acquisition unit 42a may identify the sender of the remote reset as the radio control device, and the destination as the radio device. In the case of the HLS, an F1 setup is transmitted from the radio device to the radio control device. Therefore, the information acquisition unit 42a may identify the sender of the F1 setup as the radio device, and the destination as the radio control device.

In this way, the information acquisition unit 42a may acquire information that identifies the destination and the sender as the radio control device or the radio device, based on the header information of a signal that has a predetermined direction. Thus, it is possible to save the time required to set the ports of the relay device 10a in advance.

Next, a modification of the header information conversion unit 22 (a header information conversion unit 22b) and a modification of the header information conversion unit 32 (a header information conversion unit 32b) will be described.

In the example described with reference to FIGS. 2 and 3, the relay device 10 (FIG. 1) sets the radio device A or the radio device B as the destination when the radio control device S transmits a signal, and sets the radio control device S as the destination when the radio device A or the radio device B transmits a signal. In this case, the header information conversion unit 22 only converts destination information in downlink communication, and the header information conversion unit 32 only converts sender information in uplink communication.

In another embodiment, the relay device 10 (FIG. 1) may also be given address information, and when the radio control device S transmits a signal, the relay device 10 may be set as the communication party, and when and the radio device A or the radio device B transmits a signal, the relay device 10 may be set as the communication party.

Figure 6:
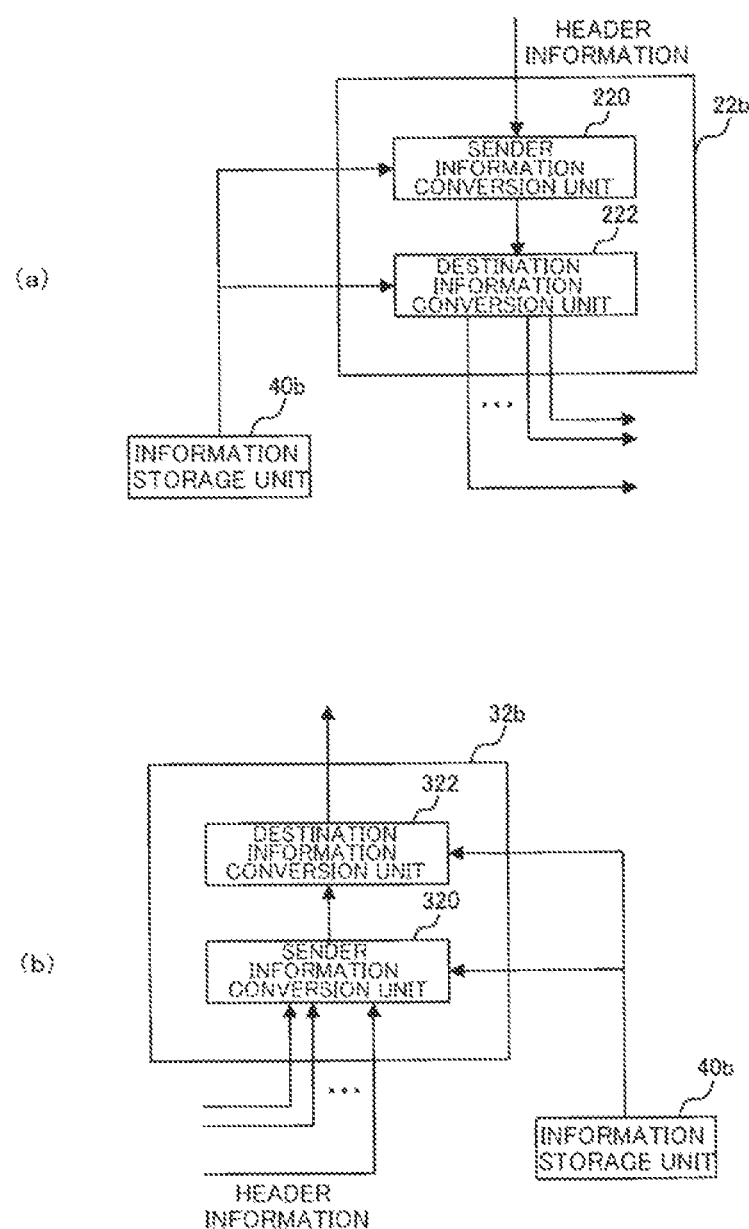
FIG. 6(a) is a diagram showing a configuration of a modification of a header information conversion unit, and surroundings thereof.
FIG. 6(b) is a diagram showing a configuration of a modification of a header information conversion unit, and surroundings thereof.
Figure 8:
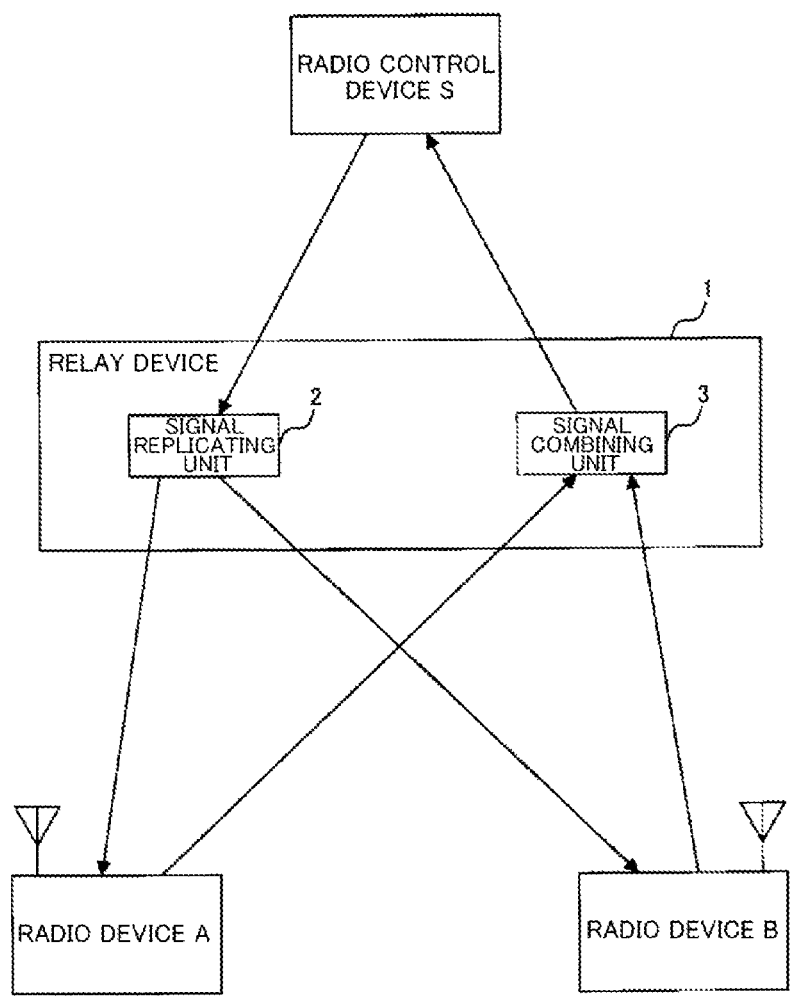
FIG. 8 is a diagram showing an example of a configuration of a conventional relay device, and surroundings thereof.

FIG. 6(a) shows a configuration of a modification of the header information conversion unit 22 (the header information conversion unit 22b), and the surroundings thereof. FIG. 6(b) shows a configuration of a modification of the header information conversion unit 32 (the header information conversion unit 32b), and the surroundings thereof.

As shown in FIG. 6(a), the header information conversion unit 22b includes a sender information conversion unit 220 and a destination information conversion unit 222. In a signal transmitted from the radio control device in downlink communication, the sender is set as a "radio control device" and the destination is set as a "relay device". In the header information conversion unit 22b, regarding a signal received from the radio control device, the sender information conversion unit 220 converts the sender to the "relay device" and the destination information conversion unit 222 converts the destination to the "radio device".

As a result, the radio device can receive a signal indicating that the destination is the radio device itself and the sender is the relay device that is set as the communication party.

As shown in FIG. 6(b), the header information conversion unit 32b includes a sender information conversion unit 320 and a destination information conversion unit 322. In a signal transmitted from the radio device in uplink communication, the sender is set as a "radio device" and the destination is set as a "relay device". In the header information conversion unit 32b, regarding a signal received from the radio device, the sender information conversion unit 320 converts the sender to the "relay device" and the destination information conversion unit 322 converts the destination to the "radio control device".

As a result, the radio control device can receive a signal indicating that the destination is the radio control device itself and the sender is the relay device that is set as the communication party.

FIG. 7 shows a specific example of information that is stored in the information storage unit 40b shown in FIG. 6(a) and FIG. 6(b). The information storage unit 40b stores, for example, an IP address and a MAC address as header information. Here, the IP address and the MAC address of each radio device are held as destination information for downlink communication. On the other hand, the IP address and the MAC address of the relay device are held as sender information for downlink communication.

The IP address and the MAC address of each radio control device are held as destination information for uplink communication. On the other hand, the IP address and the MAC address of the relay device are held as sender information for uplink communication.

When there are a plurality of radio control devices, the information storage unit 40b also stores the belongingness relationship between the radio devices and the radio control devices. In the example shown in FIG. 7, the radio device A and the radio device B belong to the radio control device S1, and the radio device C belongs to the radio control device S2.

As described above, the relay device 10 or the relay device 10a according to the embodiments makes it possible to appropriately set sender information and destination information when transferring an uplink signal and a downlink signal, and realize downlink broadcast distribution and uplink signal combination.

Note that the functions of the downlink signal processing unit 20, the uplink signal processing unit 30, and the information storage unit 40 of the relay device 10, the downlink signal processing unit 20a, the uplink signal processing unit 30a, the information storage unit 40a, and the information acquisition unit 42a of the relay device 10a, and so on may be implemented by using dedicated hardware, or implemented as a program on general-purpose hardware that is provided with a CPU and functions as a computer.

In other words, the relay device 10 and the relay device 10a according to the present invention can be realized using a computer and a program, and the program can be recorded on a recording medium or provided through a network.

All of the above-described embodiments are merely illustrative of the embodiments of the present invention, and are not restrictive, and the present invention can be implemented in other various modified or altered modes.

REFERENCE SIGNS LIST 10, 10a Relay device
20, 20a Downlink signal processing unit
21, 21a Signal dividing unit
22, 22a, 22b Header information conversion unit
23, 23a Signal replicating unit
24, 24a Signal addition assignment unit
220 Sender information conversion unit
222 Destination information conversion unit
30, 30a Uplink signal processing unit
31, 31a Signal dividing unit
32, 32a, 32b Header information conversion unit
33, 33a Signal combining unit
34, 34a Signal addition unit
320 Sender information conversion unit
322 Destination information conversion unit
40, 40a, 40b Information storage unit
42a Information acquisition unit

The invention claimed is:
1. A relay device that relays between a plurality of radio devices serving as terminal devices, and at least one radio control device that controls the radio devices, the relay device comprising:
 a processor; and
 a storage medium having computer program instructions stored thereon, when executed by the processor, perform to:
 stores predetermined conversion-target header information in a non-transitory information storage unit on the relate device; divides a downlink signal received from the radio control device into a header and a payload; makes the same number of copies of the payload of the downlink signal as the number of the plurality of destination radio devices; performs conversion on the header of the downlink signal for each destination radio device based on the header information stored in the information storage unit; adds the header to each of the payloads of the downlink signal, and transfers the payloads to the radio devices respectively corresponding thereto; divides each of uplink signals received from the plurality of radio devices into a header and a payload; combines payloads of the plurality of uplink signals for each destination radio control device; performs conversion on the header of the uplink signal for each destination radio control device based on the header information stored in the information storage unit; and adds the header to the payload of the uplink signal, and transfers the payload to the radio control device corresponding thereto wherein the predetermined conversion-target header information includes, for each radio device in the plurality of radio devices, destination information and sender information of the uplink signal in association with each other in the information storage unit as header information for downlink communication and, for each radio control device in the plurality of radio devices, destination information and sender information of the downlink signal in association with each other in the information storage unit as header information for uplink communication, such that conversion on the destination information of the downlink signal is performed using the sender information of the uplink signal, based on the header information for downlink communication stored in the information storage unit, and conversion on the sender information of the uplink signal is performed using the destination information of the downlink signal, based on the header information for uplink communication stored in the information storage unit.

2. The relay device according to claim 1, wherein the computer program instructions further perform to acquires the header information stored in the information storage unit, based on at least one of a signal transmitted from the radio device to the radio control device and a signal transmitted from the radio control device to the radio device.

3. The relay device according to claim 2, wherein the information acquisition unit acquires information that identifies the destination and the sender as the radio control device or the radio device, based on the header information of a signal that has a predetermined direction.

4. The relay device according to claim 1, wherein the downlink signal header information conversion unit performs conversion only on destination information, and the uplink signal header information conversion unit performs conversion only on sender information.

5. The relay device according to claim 1, wherein both the downlink signal header information conversion unit and the uplink signal header information conversion unit perform conversion on destination information and sender information.

6. A non-transitory computer-readable medium having computer-executable instructions that, upon execution of the instructions by a processor of a computer, cause the computer to function as the relay device according to claim 1.

7. A relay method for relaying between a plurality of radio devices serving as terminal devices, and at least one radio control device that controls the radio devices, the relay method comprising: a step in which a non-transitory information storage unit stores predetermined conversion-target header information; a step of dividing a downlink signal received from the radio control device into a header and a payload; a step of making the same number of copies of the payload of the downlink signal as the number of the plurality of destination radio devices; a step of performing conversion on the header of the downlink signal for each destination radio device based on the header information stored in the information storage unit; a step of adding the converted header to each of tile replicated payloads of the downlink signal, and transferring the payloads to the radio devices respectively corresponding thereto; a step of dividing each of uplink signals received from the plurality of radio devices into a header and a payload; a step of combining payloads of the plurality of uplink signals for each destination radio control device; a step of performing conversion on tile header of the uplink signal for each destination radio control device based on the header information stored in the information storage unit; and a step of adding the converted header to the payload of the uplink signal generated through combination, and transferring tile payload to the radio control device corresponding thereto wherein the predetermined conversion-target header information includes, for each radio device in the plurality of radio devices, destination information and sender information of the uplink signal in association with each other in the information storage unit as header information for downlink communication and, for each radio control device in the plurality of radio devices, destination information and sender information of the downlink signal in association with each other in the information storage unit as header information for uplink communication, such that conversion on the destination information of the downlink signal is performed using the sender information of the uplink signal, based on the header information for downlink communication stored in the information storage unit, and conversion on the sender information of the uplink signal is performed using the destination information of the downlink signal, based on the header information for uplink communication stored in the information storage unit.

8. The relay method of claim 7 further comprises acquiring the header information stored in the information storage unit, based on at least one of a signal transmitted from the radio device to the radio control device and a signal transmitted from the radio control device to the radio device.

9. The relay method of claim 8, further comprises acquiring information that identifies the destination and the sender as the radio control device or the radio device, based on the header information of a signal that has a predetermined direction.

10. The relay method of claim 7 further comprises performing conversion only on destination information, and performing conversion only on sender information.

11. The relay method of claim 7 further comprises performing conversion on destination information and sender information.

* * * * *